358-140
3/17/87       OR     4,651,208           SR

United States Patent [19]
Rhodes et al.

[11] Patent Number: 4,651,208
[45] Date of Patent: Mar. 17, 1987

[54] COMPATIBILITY OF WIDESCREEN AND NON-WIDESCREEN TELEVISION TRANSMISSIONS

[75] Inventors: Charles Rhodes, Atlanta, Ga.; John Lowry, Willowdale, Canada

[73] Assignee: Scientific Atlanta, Inc., Atlanta, Ga.

[21] Appl. No.: 712,779

[22] Filed: Mar. 18, 1985

[51] Int. Cl.⁴ ............................................. H04N 7/01
[52] U.S. Cl. ..................................... 358/140; 358/22; 358/180; 358/12; 358/141
[58] Field of Search ............... 358/214, 54, 77, 22, 358/12, 140, 160; 358/11, 180, 141

[56] References Cited
U.S. PATENT DOCUMENTS

| | | | |
|---|---|---|---|
| 3,097,262 | 7/1963 | Ehrenhaft | 358/180 |
| 3,541,245 | 11/1970 | Wilby | 358/280 |
| 3,821,468 | 6/1974 | Busch | 358/183 |
| 3,824,336 | 7/1974 | Gould et al. | 358/335 |
| 3,863,022 | 1/1975 | Bruch | 358/323 |
| 3,931,638 | 1/1976 | Lentz | 360/36.1 |
| 3,935,381 | 1/1976 | Petrocelli et al. | 358/180 |
| 4,079,417 | 3/1978 | Scudder, III | 358/111 |
| 4,085,425 | 4/1978 | Hamill | 358/237 |
| 4,134,128 | 1/1979 | Hurst | 358/22 |
| 4,223,343 | 9/1980 | Belmares-Sarabia et al. | 358/54 |
| 4,249,211 | 2/1981 | Baba et al. | 358/183 |
| 4,282,546 | 8/1981 | Reitmeier | 358/160 X |
| 4,394,690 | 7/1983 | Kobayashi | 358/180 |
| 4,476,493 | 10/1984 | Poetsch et al. | 358/214 |
| 4,513,324 | 4/1985 | Poetsch | 358/214 |
| 4,564,857 | 1/1986 | LoCicero et al. | 358/11 |
| 4,567,508 | 1/1986 | Hulyer | 358/141 X |
| 4,581,640 | 4/1986 | Cole | 358/141 |

FOREIGN PATENT DOCUMENTS
2140242A 11/1984 United Kingdom .

OTHER PUBLICATIONS
Centre Commun D'etudes De Telediffusion Et Telecommunications (CCETT), GT V1/EVSS 233, E only, Cesson, Jan. 21, 1985.
B. Wendland, "Extended Definition Television with High Picture Quality", 92 SMPTE Journal 1028, Oct. 1983.
Windram, et al., "MAC—A Television System for High Quality Satellite Broadcasting," IBA, Report 118/82, Crawley Court, Winchester, Hants, U.K.

Primary Examiner—James J. Groody
Assistant Examiner—E. Anne Toth
Attorney, Agent, or Firm—Banner, Birch, McKie & Beckett

[57] ABSTRACT

A widescreen television picture is sampled at a higher sampling rate so as to fit all of the information in the current 52.5 µs active video line time. A selection signal is also incorporated with the widescreen picture signal, allowing non-widescreen television receivers to display a contiguous portion of the widescreen picture without geometric distortion. The widescreen television signal is transmitted either in MAC or widescreen NTSC format, and is received by a decoder. The decoder allows the entire widescreen picture to be displayed on a widescreen receiver, and makes use of the selection signal to display the selected portion of the picture on a standard receiver without geometric distortion. In another embodiment, a decoder allows television signals having the standard aspect ratio to be displayed on receivers having widescreen aspect ratios without geometric distortion.

42 Claims, 7 Drawing Figures

COMPATIBILITY OF WIDESCREEN AND NON-WIDESCREEN TELEVISION TRANSMISSIONS

BACKGROUND OF THE INVENTION

1. Technical Field

This invention relates to the transmission of widescreen television signals for reception and display on both widescreen televisions and non-widescreen televisions. The term "widescreen television" refers to a television having a display whose ratio of width to height (the aspect ratio) is greater than a predetermined reference value.

One aspect of this invention allows the widescreen transmission to be displayed either in its entirety on a widescreen display or in a contiguous portion on a non-widescreen receiver. Another aspect of this invention relates to the inverse operation of allowing a non-widescreen transmission to be displayed on a widescreen display wherein the aspect ratio of the displayed picture is that of a non-widescreen display.

2. Background Information

The current standard of all television broadcasts has an aspect ratio (the ratio of the display width to the display height) of 4:3, or 1.3333. This aspect ratio was based on the motion picture practice at the time of standardization.

In the United States, Canada and Japan, color broadcasts are made according to the National Television System Committee (NTSC) composite standards. Color video signals broadcast under the NTSC standard require that picture information be separated into two components: luminance, or brightness, and chrominance, or color. FIG. 1 is an amplitude-vs.-frequency diagram illustrating, in simplified form, a typical NTSC composite color television signal 50 comprising a luminance signal 52 and a chrominance signal 54. (A composite television signal is one in which chrominance information is carried on a subcarrier.) The signal occupies a nominal bandwidth of 6 MHz with the picture carrier 56 being 1.25 MHz above the lower end of the band. Luminance information is modulated directly onto picture carrier 56, while chrominance information is modulated onto color subcarrier 58 which is in turn used to modulate picture carriers 56. Color subcarrier 58 has a frequency of 3.579545 MHz, a standard established by the NTSC. (Audio information is carried on another subcarrier 40 lying near the upper edge of the band.)

Television signals are produced and displayed as a result of a line scanning process. The picture information is scanned using a progressive series of horizontal lines which are transmitted sequentially in time. The transmitted signal is a continuous analogue of the brightness intensity corresponding to each point of the line. Such a signal is shown in FIG. 2 from which it may be seen that in a series of standard lines, any two adjacent active line periods (periods during which video information is transmitted) are separated by a period in which no video information is transmitted. This latter period is known as the line blanking interval and is introduced to allow the scanning device in the receiver to reset to the line-start position.

In the NTSC standard, the active line period includes one signal which simultaneously represents the instantaneous values of three independent color components. Other composite signals, SECAM, which is used in France, and PAL, which predominates the rest of Europe, have the same basic format as the NTSC standard, including a line-blanking interval and an active line period in each scan.

The region labeled A in FIG. 1 is of particular importance for it represents overlap between the luminance 52 and chrominance 54 signals. Since separation of luminance and chrominance is accomplished by filtering a frequency-division multiplexed signal, overlaps such as A between the two signals lead to several problems. If, upon reception, complete separation between luminance and chrominance is desired, the necessary filtering will cause the loss of some of the information in both signals. On the other hand, if no loss of information can be tolerated, then one must accept interference between the luminance and chrominance signals. Moreover, since the various parts of the NTSC television signals are transmitted at different frequencies, phase shifts occurring during transmission will affect them differently, causing the signal to deteriorate. Also, the available color information is severely limited by the small color bandwidth permitted.

Other types of analogue video signals which are particularly adapted to transmission by satellite and cable, and which lead to improved picture quality in comparison with existing standards, are presently being studied. These signals are based on a time multiplex of the three independent color components during the active line period of the scan line. Instead of coding the three components into one signal using the NTSC, PAL or SECAM standard, the components are sent sequentially using a time-compression technique. One version of this type of signal is know as MAC (Multiplexed Analogue Components). Signals generated by a time compression technique also adhere to the same basic format as the NTSC, PAL and SECAM standards, including the presence of a line-blanking interval and an active line period in each scan line. It should be noted that when a MAC signal is employed, digital data may also be transmitted during the line-blanking interval.

A MAC color television signal is illustrated in FIG. 3, which is an amplitude-vs.-time diagram of a single video line of 63.56 us duration. The first 10.9 us is in the horizontal blanking interval (HBI) 62, in which no picture information is transmitted. Following HBI 62 are chrominance signal 64 and luminance signal 66, either of which may be time-compressed. Between chrominance signal 64 and luminance signal 66 is a 0.28 us guard band 68, to assist in preventing interference between the two signals.

The MAC color television signal of FIG. 3 is obtained by generating conventional luminance and chrominance signals (as would be done to obtain a conventional NTSC or other composite color television signal) and then sampling and storing them separately. Luminance is sampled at a luminance sampling frequency and stored in a luminance store, while chrominance is sampled at a chrominance sampling frequency and stored in a chrominance store. The luminance or chrominance samples may then be compressed in time by writing them into the store at their individual sampling frequency and reading them from the store at a higher frequency. A multiplexer selects either the luminance store or the chrominance store, at the appropriate time during the active line period, for reading, thus creating the MAC signal of FIG. 3. If desired, audio samples may be transmitted during the HBI; these are multiplexed (and may be compressed) in the same manner as the video samples. The sample rate at which all samples occur in the multiplexed MAC signal is called the MAC sampling frequency.

With the adoption of a new transmission standard, a new and improved television service should offer a wider aspect ratio for, among other reasons, motion pictures have adopted wider aspect ratios. For example, motion pictures are commonly filmed with aspect ratios of 1.85:1. The Society of Motion Picture and Television Engineers (SMPTE) favors an aspect ratio for a television production standard of 16:9, which is the square of the standard 4:3 television aspect ratio. Another aspect ratio under consideration for new television systems is 5:3.

With the introduction of a widescreen television receiver, more samples per line of active video will occur in order to display the picture on the wider screen. Thus, the sampling rate of the picture elements will be higher if more samples are to be transmitted during the same active video line time. Correspondingly, the sample rate at the widescreen receiver would have to be higher.

One problem with the introduction of any new television system is its compatability with the standard 4:3 aspect ratio receivers presently in use by the public.

One way to achieve compatability is to transmit two television signals, one having the widescreen aspect ratio for receivers having a widescreen and the other having the standard aspect ratio for receivers having the standard screen. The standard aspect ratio television picture could be generated by selecting a portion of the widescreen picture. Both could be transmitted simultaneously for the simultaneous receipt at both aspect ratio televisions. The method of selecting a portion of the widescreen picture is known in the prior art. For example, U.S. Pat. No. 4,476,493, issued to Poetsch et al., and U.S. Pat. No. 4,223,343, issued to Belmares-Sarabia et al. both discuss this method of selecting a portion of a widescreen picture for display on standard televisions. This method, however, is costly for it requires dual storage and transmission of every picture.

Another possibility is to transmit the entire widescreen television signal and let the standard aspect ratio television skip alternate samples, allowing the widescreen picture to fit on the standard display. Such a method is described in U.S. Pat. No. 4,134,128, issued to Hurst. However, this method causes geometric distortion of the picture on the standard display.

Another possible method is to display the widescreen picture on the standard display, causing the widescreen picture width to be squeezed into the standard display and the height to be displayed by only a portion of the standard display height so as to affect a simulated widescreen aspect ratio. This method is contemplated in U.S. Pat. No. 4,394,690, issued to Kobayashi. This method, however, also geometrically distorts the picture, in addition to not making full use of the display screen.

Another problem with the introduction of any new television system is that the broadcasts or home recorded versions of 4:3 aspect ratio television signals would not be compatible with the new widescreen television receivers.

SUMMARY OF THE INVENTION

It is therefore an object of the present invention to transmit a widescreen television signal for display on both a widescreen receiver and a non-widescreen receiver without introducing geometric distortion.

It is also an object of the present invention to transmit a widescreen television signal for display on a non-widescreen receiver wherein a contiguous portion of the widescreen signal is displayed.

It is a further object of the present invention to transmit a widescreen television signal for reception at both widescreen and non-widescreen receivers in either NTSC or MAC format, and to do so in the same time used to transmit NTSC signals currently in use for non-widescreen receivers.

It is also a further object of the present invention to display non-widescreen television pictures on widescreen displays, and to do so without introducing geometric distortion.

These and other objects of the present invention are accomplished by sampling a widescreen television picture at a higher sampling rate so as to fit all of the information in the current 52.5 us active video line time. A selection signal is also incorporated with the widescreen picture signal, allowing non-widescreen television receivers to display a contiguous portion of the widescreen picture without geometric distortion. The widescreen television signal is transmitted either in MAC or widescreen NTSC format, and is received by a decoder. The decoder allows the entire widescreen picture to be displayed on a widescreen receiver, and makes use of the selection signal to display the selected portion of the picture on a standard receiver without geometric distortion. In another embodiment, a decoder allows television signals having the standard aspect ratio to be displayed on receivers having widescreen aspect ratios without geometric distortion.

In this way, both widescreen and non-widescreen television signals are fully compatible on either widescreen or non-widescreen receivers.

The spirit of this invention is to transmit a widescreen television signal in such a manner that it can be displayed on either a widescreen receiver or a non-widescreen receiver, without producing geometric distortion at the display of either receiver. The television signal can be transmitted in either an NTSC or MAC format. If NTSC format is employed, a higher color subcarrier frequency is used in order to make the wider television picture fit in the same active video line time (52.5 us). If MAC format is employed, the signal may be transmitted at the standard frequency of 6 Fsc or at a higher frequency. Regardless of the method employed for transmitting the widescreen television signal, the invention also provides a device for receiving the transmission and time-compressing the signal for display on either a widescreen or non-widescreen display.

DESCRIPTION OF THE PREFERRED EMBODIMENTS

Figure 1:
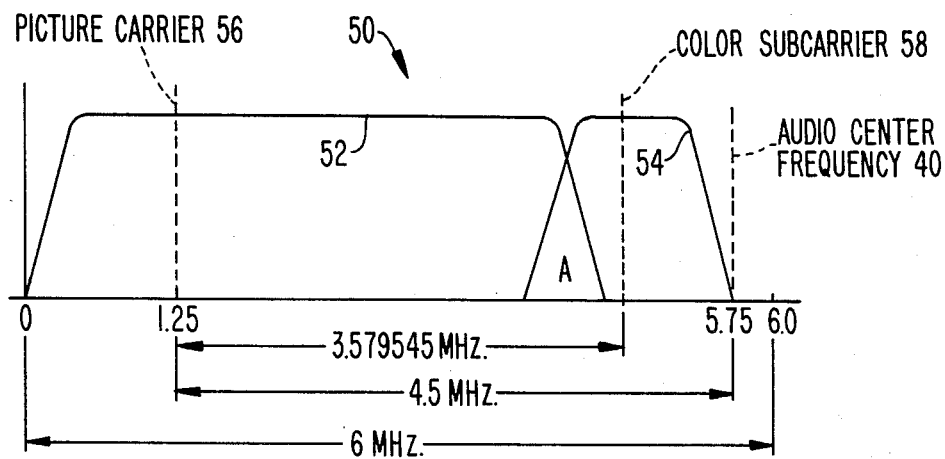
FIG. 1 is an amplitude-vs.-frequency diagram illustrating in simplified form a typical NTSC color television signal.
Figure 2:
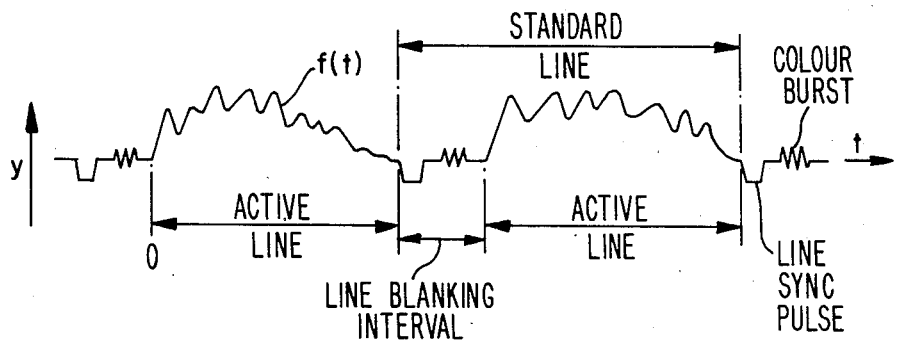
FIG. 2 is an amplitude-vs.-time diagram of a typical NTSC color television signal.
Figure 3:
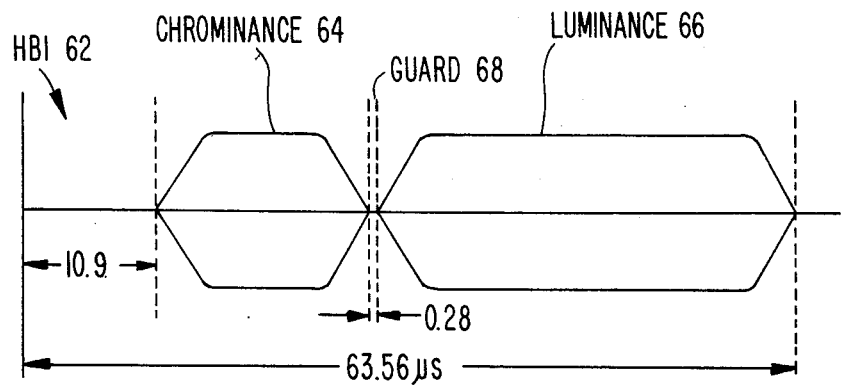
FIG. 3 is an amplitude-vs.-time diagram of a single video line of a typical MAC color television signal.
Figure 4:
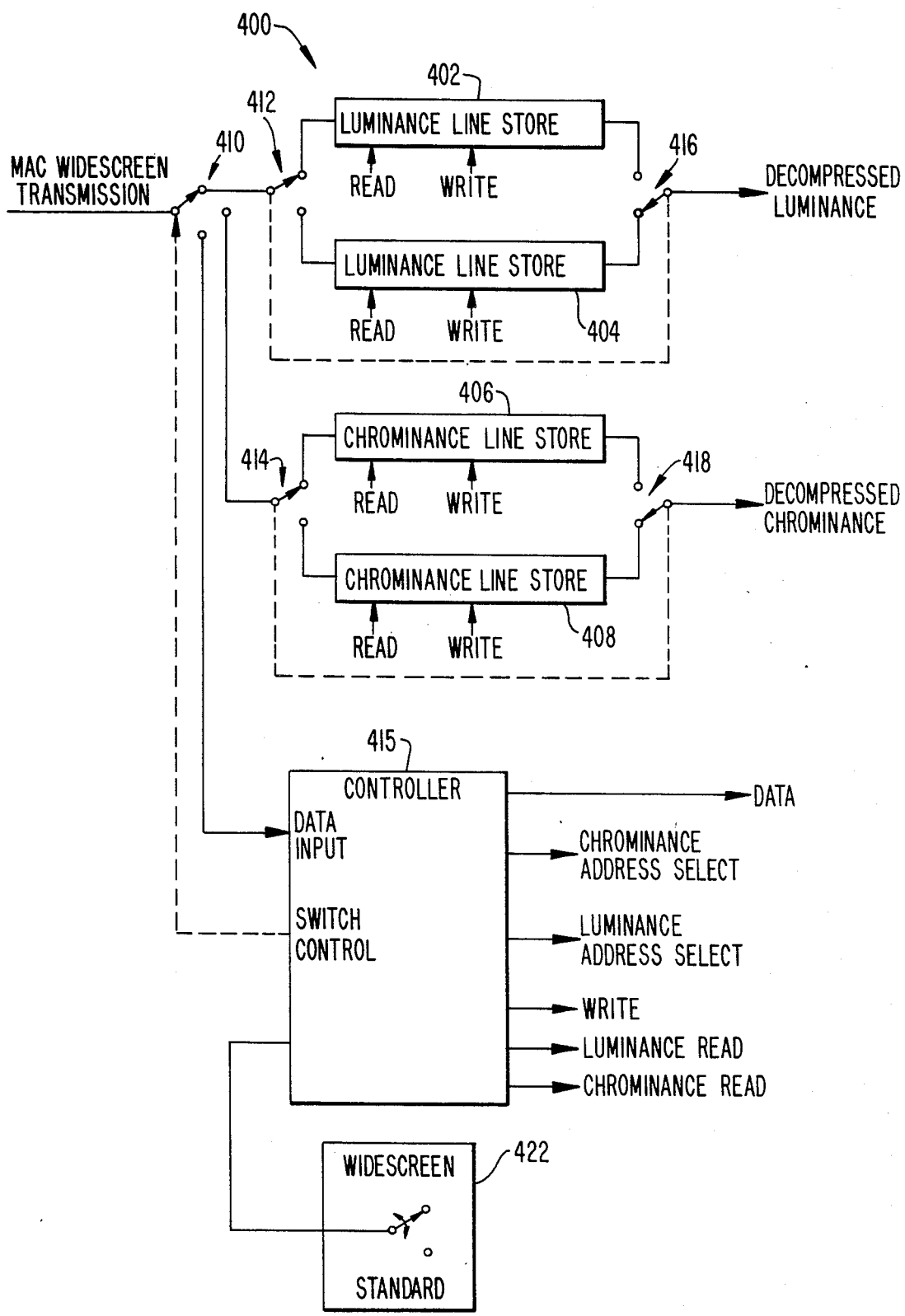
FIG. 4 is a simplified block diagram of the decoder of the present invention wherein a MAC widescreen color television signal is transmitted for display on both widescreen and standard screen displays.

Turning now to FIG. 4, the decoder 400 for receiving a MAC transmission of the widescreen color television signal will now be discussed. The MAC transmission is received by an antenna (not shown) and sent to switch 410, controlled by controller 415. Controller 415 controls switch 410 to direct MAC luminance to switch 412, chrominance to switch 414, and the remainder of the received signal to controller 415. A user-controlled switch 422 informs the controller as to the size of the display attached to decoder 400.

The MAC signal is transmitted serially as analog components and, therefore, a sample-and-hold and an A/D converter (not shown) are required in order to receive the MAC transmission. The sampling frequency will be the frequency to which samples were originally compressed before transmission. (In the event sufficient bandwidth is available so that the time compressed components may be transmitted digitally, the sample-and-hold and A/D converter would not be necessary.)

Luminance data is written into luminance line store 402 at the sampling frequency and is read out at a lower frequency, explained below. Similarly, chrominance data is written into chrominance line store 406 at the sampling frequency and is read out at a lower frequency, also explained below. Because the luminance and chrominance data must be decompressed, two line stores are provided for each component. One line store (402 or 406) is written into while the other line store (404 or 408) is read. Switches 412 and 414 control read/write while switches 416 and 418 control write/-read, respectively, and are themselves controlled by controller 415 to alternate every active line period.

The line stores are preferably randomly accessable, such as RAM, but can be of the first-in, first-out (FIFO) type, such as charge-coupled devices (CCD).

Switch 422, user-selected at the time that the decoder is first installed at the television receiver, informs controller 415 of the aspect ratio of the television display. If switch 422 is set at the WIDESCREEN position, all of the memory locations in the line stores are used by the display to display the widescreen picture. These time decompressed components are sent to a converter (not shown) for display on a widescreen display. The converter is well-known to those skilled in the art, and either converts the luminance and chrominance to PAL, SECAM, or NTSC format for a PAL, SECAM, or NTSC type widescreen receiver, respectively, or matrixes the luminance and chrominance to Red, Green and Blue color components for an RGB widescreen receiver.

If switch 422 is set to the STANDARD position, all of the luminance and chrominance components in the line stores will not fit on the display. Preferably, a selection signal, sent with the widescreen television signal, informs the controller which memory locations to use for ultimate display.

The widescreen television signal is monitored before transmission, and an operator manually selects the center of interest and causes a signal to be generated which is transmitted with the picture. Methods of selecting the center of interest and generating the selection signal are well-known to those skilled in the art, as shown, for example, by U.S. Pat. Nos. 4,476,493 and 4,223,343 (discussed above). The selection signal could represent, for example, the offset between the centers of the 16:9 and 4:3 displays or the first or last memory location where the selected portion is stored in memory (offset between right edges or left edges). In the preferred embodiment, this selection signal is sent during the vertical blanking interval. If no selection signal is transmitted with the widescreen television signal, the decoder will generate a default selection signal.

Controller 415 receives the data, including the selection signal, from switch 410, recapturing the selection signal and passing the rest of the data to the television receiver (not shown). The selection signal is decoded by controller 415 and used to generate the start and end addresses for reading out the luminance and chrominance components from the line stores. The chrominance and luminance address signals represent a display enable signal.

Although the above description has assumed the use of random access memory as the line stores, the preferred embodiment alternatively contemplates the use of first-in-first-out (FIFO) memories. Each of the four line stores (two luminance and two chrominance) must have enough memory locations to store an entire widescreen active video line of the respective samples (752 for luminance and 376 for chrominance). The selection signal may then be used to control either the writing of samples into the line stores, or the reading of samples from them.

If the selection signal controls the writing of samples, it is used to switch the input of the FIFO between actual samples of the video line and a zero signal. For example, if the leftmost portion of the widescreen picture is to be displayed on a non-widescreen display, the selection signal will first cause actual picture signals to be written into the FIFO. When enough picture signals (564) have been written to fill a non-widescreen line, the selection signal will cause zero signals to fill the remainder of the FIFO. Upon reading, the zero signals are simply discarded.

If the selection signal is to control the reading of samples, first the entire widescreen line is written into the FIFO. Then the selection signal either connects the FIFO's output to the display, or it does not. Once again, assuming that the leftmost portion of a widescreen active video line is to be displayed on a non-widescreen display, the selection signal would cause the FIFO to be connected to the display during the reading of the first 564 samples and disconnected from the display during the reading of the remainder (which would again be discarded).

The rate at which the luminance and chrominance components are written into and read from their respective line stores in order to achieve time decompression will now be discussed. The write clock rate will be the sampling frequency. In the preferred embodiment, this is six times the color subcarrier frequency (6 Fsc). The luminance read clock rate will preferably be two-thirds of the sampling frequency (4 Fsc), and the chrominance read clock rate will ordinarily be half the luminance read clock value (2 Fsc). To decompress the components so that they can be displayed on the standard aspect ratio display, the standard screen read clock rates are determined by the following equations:

$$RCS_L = \frac{\text{STANDARD ASPECT RATIO}}{\text{WIDESCREEN ASPECT RATIO}} \cdot RCW_L$$

$$RCS_C = RCS_L/2$$

wherein
$RCS_L$ = luminance read clock for standard screen
$RCW_L$ = luminance read clock for wide screen
$RCS_C$ = chrominance read clock for standard screen

EXAMPLE 1

Samples of a 1.85:1 aspect ratio widescreen television signal will be transmitted at 6 Fsc. Accordingly, the luminance and chrominance write clocks at the receivers will also be 6 Fsc. For display on 1.85:1 aspect ratio, the luminance read clock will be 4 Fsc, and the chrominance read clock will be 2 Fsc. For display on standard (4/3) aspect ratio televisions, the luminance read clock will be:

$$\frac{4/3}{1.85} \cdot 4\, Fsc = 2.88\, Fsc$$

and the chrominance read clock will be 1.44 Fsc.

EXAMPLE 2

Samples of a 16:9 aspect ratio widescreen television signal will be transmitted at 6 Fsc. Accordingly, the luminance and chrominance write clocks at the receivers will also be 6 Fsc. For display on 16:9 aspect ratio televisions, the luminance read clock will be 4 Fsc, and the chrominance read clock will be 2 Fsc. For display on standard (4:3) aspect ratio televisions, the luminance read clock will be:

$$\frac{4/3}{16/9} \cdot 4\, Fsc = 3\, Fsc$$

and the chrominance read clock will be 1.5 Fsc.

By the above two examples, it can be seen that the ratio of the receiver's aspect ratio to that of the transmitted signal determines the proper write clock rates. This holds true regardless of the frequency at which samples are transmitted. For example, if samples of 16:9 aspect ratio signal were MAC formatted and transmitted at 8 Fsc, the luminance read clock would be 4 Fsc, and the chrominance read clock would be 2 Fsc for display on a 16:9 aspect ratio display; the luminance read clock would be ((4/3)/(16/9))×4 Fsc=3 Fsc, with the chrominance read clock being 1.5 Fsc, for display on a standard (4:3) aspect ratio display.

Figure 5:
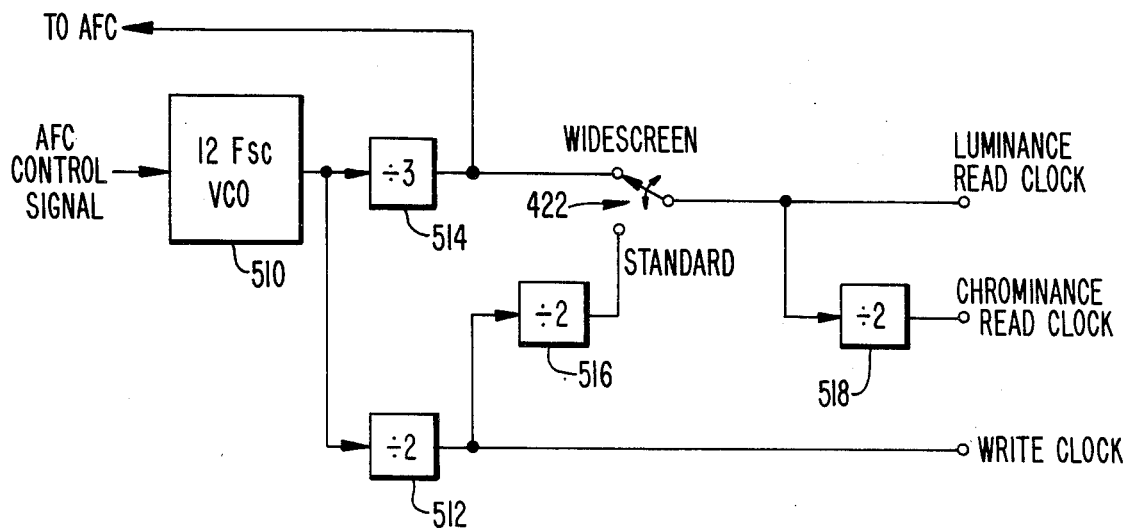
FIG. 5 is a simplified block diagram of the clock frequency generator circuitry required by the decoder of FIG. 4.

FIG. 5 shows a simplified block diagram of the clock frequency generator circuitry used by the decoder of FIG. 4. As in standard B-MAC, a voltage controlled oscillator 510 operates at 12 Fsc, and is frequency locked to the B-MAC burst which follows data and precedes chrominance in each line. Oscillator 510 drives two frequency dividers 512 and 514, producing the 6 Fsc write clock and the 4 Fsc widescreen luminance read clock, respectively. Divider 512 drives frequency divider 516, producing the 3 Fsc non-widescreen luminance read clock. Frequency divider 518 divides the luminance read clock by two, producing the chrominance read clock. Both read clock frequencies are controlled by switch 422, which is the same switch as shown in FIG. 4.

It is also possible to transmit an NTSC-like signal carrying all of the widescreen television signal information. However, in order to get all of the information in the same active video line of 52.5 us, the signal must be time-compressed. As the NTSC and similar composite signals are analog, time-compression is achieved by modulating the widescreen color information onto a higher subcarrier frequency. The new subcarrier frequency (F'sc) will be determined according to the following equation:

$$\frac{\text{WIDESCREEN ASPECT RATIO}}{\text{NON-WIDE SCREEN ASPECT RATIO}} \cdot$$

$$\text{NON-WIDESCREEN SUBCARRIER} = Fsc$$

where
NON-WIDESCREEN ASPECT RATIO=4.3
NON-WIDESCREEN SUBCARRIER=3.57945 MHz

Therefore, if the widescreen aspect ratio is chosen as 1.85:1, the widescreen signal's color subcarrier will be approximately 4.9667 MHz. Similarly, for an aspect ratio of 16:9, the new color subcarrier will be approximately 4.7727 MHz, and for an aspect ratio fo 5:3, the modulating subcarrier will be approximately 4.4744 MHz.

As these frequencies are not prime numbers, the design of a new generator may be simplified. Additionally, other odd integers near these values could be used with very minor changes in the actual aspect ratio of the signal transmitted. It is known that small differences in the aspect ratio are not noticed by the observer.

Figure 6:
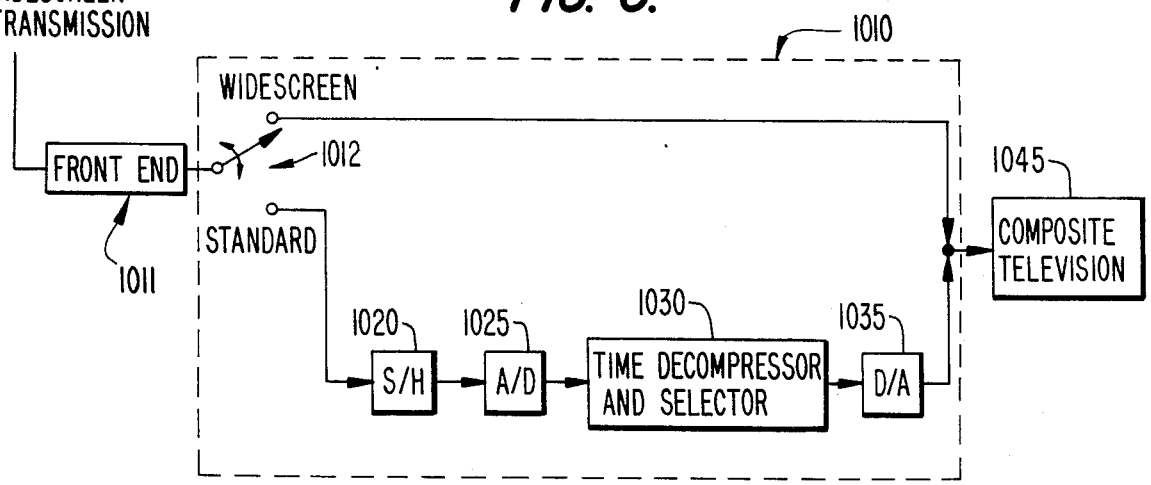
FIG. 6 is a simplified block diagram of the decoder of the present invention wherein an NTSC widescreen television signal is transmitted for display on both widescreen and standard screen displays.

Turning now to FIG. 6, a description of the decoder of the present invention wherein a composite widescreen signal is transmitted for display on both widescreen and standard (NTSC) displays will now be discussed. The baseband signal is received from a television receiver front end 1011, which includes a demodulator for demodulating the received signal to baseband, and processed by decoder 1010 as follows. Switch 1012 is set by the user, informing decoder 1010 of the display aspect ratio to which the decoder is connected. If switch 1012 is set at WIDESCREEN, the decoder simply passes the entire widescreen signal to composite television 1045.

If switch 1012 is set at STANDARD, the analog signal is converted to digital by sample-and-hold circuit 1020 and A/D converter 1025. This digital signal is written into a memory at a first clock rate and read out at a second (slower) clock rate. A portion of the samples read out are selected for display by time decompressor and selector 1030. The time decompressor requires two memories, one of which is written into while the other is read from. The portion of the samples read out (if random access memories) or written in (if FIFO memory devices) are selected according to the selection signal previously described with reference to FIG. 4. If no selection signal is present, a default position is generated by the decoder. The control of the memories and the selection is identical to the description of FIG. 4. The selected portion of the widescreen signal is converted back to analog by digital-to-analog converter 1035, and the selected portion is then passed to composite television 1045. The decompressed signal will contain a color subcarrier of 3.579545 MHz, if the non-widescreen television is designed to receive NTSC signals.

Figure 7:
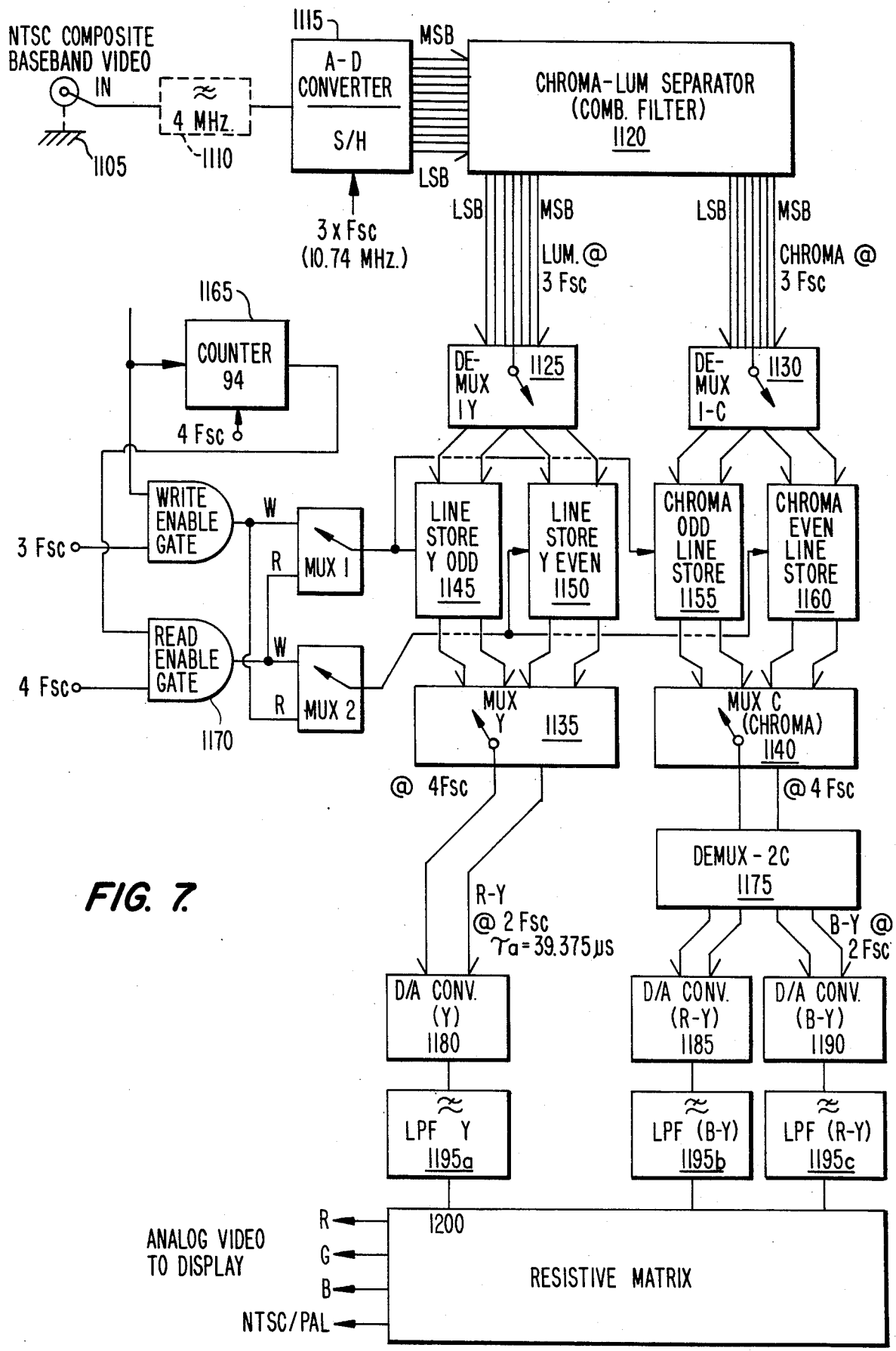
FIG. 7 is a simplified block diagram of the decoder of the present invention wherein a conventional NTSC television signal is displayable on a widescreen display.

Decoders have been described for allowing widescreen transmissions to be compatible with non-widescreen receivers. Given the vast amount of non-widescreen pictures, either transmitted by television stations or stored at home on video tape, there is a need for widescreen receivers to be compatible with these non-widescreen signals. Turning now to FIG. 7, a decoder for displaying standard television signals on widescreen displays having an aspect ratio of 16:9 will now be discussed.

The NTSC composite baseband video signal is input at the decoder at input port 1105, where it is optionally low pass filtered 1110 and converted to a digital signal by sample-and-hold and A/D converter 1115. The digital samples need to be time-compressed to fit on the widescreen display without distortion. To do this, demultiplexers 1125 and 1130, along with multiplexers 1135 and 1140, time compress the samples through line stores 1145–1160. The compressed picture will not fill up the entire widescreen display. The non-widescreen signal, compressed for displaying without distortion on a widescreen display, is delayed by counter 1165 and read enable gate 1170 by a delay preferably causing the displaying picture to be centered on the widescreen display. During the delay, no picture elements are output from the line stores. Additionally, no picture elements are output after the line stores have read out the entire non-widescreen video line. The absence of picture elements creates null components which are used to produce a border for bordering the non-widescreen signal on the widescreen display. It is noted that luminance and chrominance are written into their respective line stores at 3 Fsc and read out at 4 Fsc. This time-compressor ratio (4:3) is the ratio of the widescreen aspect ratio (16:9) to the standard screen aspect ratio (4:3). Other read/write rates could be chosen, and will also be dependent upon the widescreen aspect ratio.

The compressed chrominance components are separated into their R-Y and B-Y components by demultiplexer 1175. The luminance and R-Y and B-Y chrominance components are converted to analog by digital-to-analog converters 1180, 1185 and 1190, respectively, where they are lowpass filtered by filters 1195a, b, and c, respectively, and converted into displayable signals by converter 1200. Converter 1200 either converts the signals for NTSC, PAL or SECAM, or matrixes the signals for display on an RGB display.

Although illustrative embodiments of the present invention have been described in detail with reference to the accompanying drawings, it is to be understood that the invention is not limited to those precise embodiments and that various changes or modifications may be effected therein by one skilled in the art without departing from the scope or spirit of the invention.

We claim:

1. A method of displaying a transmitted television signal having a first aspect ratio at both a television receiver having a first aspect ratio and a television receiver having a second aspect ratio, wherein the transmitted signal comprises luminance signal components, the method comprising the steps of:
   writing the luminance signal components into a first memory device at a first clock rate;
   reading the luminance signal components at either a second clock rate which represents the clock rate for displaying the television signals on the television receiver having the second aspect ratio or a third clock rate corresponding to the product of the second clock rate and the ratio of the first aspect ratio to the second aspect ratio; and,
   selectively displaying at the respective receivers the signal components read from the first memory device.

2. The method of claim 1 wherein the transmitted signals also comprises chrominance components, wherein the method further comprises the steps of:
   writing the chrominance signal components into a second memory device at a fourth clock rate;
   reading the chrominance signal components stored in the second memory device at either a fifth clock rate which represents the clock rate for displaying the television signal on the television receiver having the second aspect ratio or a sixth clock rate corresponding to the product of the fifth clock rate and the ratio of the first aspect ratio to the second aspect ratio; and,
   selectively displaying at the respective receivers the signal components read from the second memory device.

3. The method of claim 2 wherein the fourth clock rate equals the first clock rate.

4. The method of claim 3 wherein a selected portion of the stored luminance and chrominance signal components are read from said first memory device and said second memory device, respectively, for displaying the selected portion of the television signal on the television receiver having the second aspect ratio.

5. A method of displaying a transmitted widescreen television signal at both a widescreen receiver and a non-widescreen receiver wherein the transmitted signal comprises separate luminance and chrominance signal components, the method comprising the steps of:
   writing the luminance signal components into a first memory device at a first clock rate;
   writing the chrominance signal components into a second memory device at a second clock rate;
   reading the luminance signal components stored in the first memory device at either a third clock rate corresponding to the clock rate for displaying television signals on the non-widescreen receiver or a fourth clock rate corresponding to the product of the third clock rate and the ratio of the aspect ratio of the widescreen receiver to that of the non-widescreen receiver;
   reading the chrominance signal components stored in the second memory device at either a fifth clock rate corresponding to the clock rate for displaying television signals on the non-widescreen receiver or a sixth clock rate corresponding to the product of the fifth clock rate and the ratio of the aspect ratio of the widescreen receiver to that of the non-widescreen receiver; and,
   selectively displaying the signals read from the first and second memory devices at the respective receivers.

6. The method of claim 5 wherein the second clock rate equals the first clock rate.

7. The method of claim 5 wherein a predetermined portion of the stored luminance and chrominance signal components are read from the first and second memory devices, respectively, for displaying a predetermined portion of the television signal on the non-widescreen receiver.

8. The method of claim 7 wherein the portion of luminance and chrominance signal components read from the memory devices is determined by a selection signal.

9. The method of claim 8 wherein the selection signal is transmitted with the transmitted television signal.

10. The method of claim 8 wherein the selection signal is representative of a picture element of the portion of the signal components read from the memory devices.

11. The method of claim 10 wherein the picture element is the first picture element.

12. The method of claim 10 wherein the picture element is the last picture element.

13. The method of claim 10 wherein the picture element is the center picture element.

14. The method of claim 8 wherein the selection signal is representative of an address of each of the memory devices.

15. The method of claim 7 wherein the determined portion of the signal components read from the memory devices is contiguous.

16. A method of transmitting a widescreen television signal so as to display a portion of the widescreen television signal without geometric distortion on a non-widescreen television, the method comprising the steps of:
selecting the portion of the widescreen television signal;
developing a selection signal representative of the selected portion; and
transmitting the entire widescreen television signal together with the selection signal.

17. A method of displaying a line of a widescreen line-and-field scanned television signal so as to display the entire line on a widescreen receiver's display and a portion of the entire line on a non-widescreen receiver's display, the method comprising the steps of:
selecting the portion of the line;
developing a selection signal representative of the selected portion;
transmitting the entire line;
transmitting the selection signal;
receiving the entire line at the widescreen receiver;
displaying the entire line on the widescreen receiver's display;
receiving the entire line and the selection signal at the non-widescreen receiver; and
displaying the portion of the line on the non-widescreen receiver's display according to the selection signal.

18. The method of claim 17 wherein the selection signal is transmitted with the entire widescreen signal during the vertical blanking interval of the widescreen signal.

19. A method of transmitting and receiving a composite color television signal having a first aspect ratio for display on both a display screen having the first aspect ratio and a display screen having a second aspect ratio, the method comprising the steps of:
transmitting the composite color signal at a subcarrier substantially corresponding to the product of the ratio of the first aspect ratio to the second aspect ratio and the horizontal scanning frequency;
receiving the transmitted composite color signal and demodulating the transmitted signal to baseband;
selectively displaying the baseband color signal by either
(a) decoding the baseband color signal for display on the display screen having the first aspect ratio; or
(b)
(i) time decompressing the baseband color signal by an amount proportional to the ratio of the second aspect ratio to the first aspect ratio; and
(ii) decoding the time decompressed signal for display on the display screen having the second aspect ratio.

20. The method of claim 19 wherein the step of time decompression includes the steps of:
writing the received signal into a memory at a first clock rate corresponding to the transmitted subcarrier frequency; and
reading the written signals out from the memory at a second clock rate corresponding to the product of the first clock rate and the ratio of the second aspect ratio to the first aspect ratio.

21. The method of claim 19 wherein the step of demodulating the received signal includes the step of:
demodulating the time-compressed signal at the second clock rate.

22. A method of selecting a portion of a transmitted line and field scanned television signal having a first aspect ratio for display on a television receiver having a second aspect ratio, the method comprising the steps of:
writing a line of transmitted signal into a memory at a first clock rate;
reading the line of the written signal from the memory at a second clock rate;
developing a display enable signal for enabling a contiguous portion of the line read from the memory to be displayed on a television receiver having the second aspect ratio.

23. The method of claim 22 wherein the display enable signal enables the contiguous portion of the line to be displayed after a predetermined number of memory locations have been read out.

24. The method of claim 23 wherein the transmitted television signal includes a selection signal, and wherein the selection signal is representative of the predetermined number of memory locations.

25. The method of claim 22 wherein the ratio of the second clock rate to the first clock rate is substantially the ratio between the first aspect ratio to the second aspect ratio.

26. A method of displaying a portion of a transmitted line-and-field scanned television signal having a first aspect ratio for display on a television receiver having a second aspect ratio, the method comprising the steps of:
sampling the transmitted signal at a first clock rate;
separating the sampled signal into chrominance components and luminance components;
writing the chrominance components into a first memory means at the first clock rate;
writing the luminance components into a second memory means at the first clock rate;
reading the chrominance components from the first memory means at a second clock rate;
reading the luminance components from the second memory means at a third clock rate;
developing a display enable signal for enabling a contiguous portion of the chrominance components and a correspondingly contiguous portion of the luminance components to be displayed;

displaying the contiguous portion of the chrominance and luminance components on the display having the second aspect ratio according to the display enable signal.

27. The method of claim 26 wherein the display enable signal enables the contiguous portion of the chrominance and luminance components to be displayed after a predetermined number of first and second memory locations have been read out, respectively.

28. The method of claim 27 wherein the transmitted signal includes a selection signal, and wherein the selection signal is representative of the predetermined number of first and second memory locations.

29. The method of claim 26 wherein the ratio of the second clock rate to the first clock rate is substantially the ratio between the first aspect ratio to the second aspect ratio.

30. A method of converting a composite line-and-field scanned video signal into a signal for display on a widescreen display wherein the signal displayed has a non-widescreen aspect ratio, the steps of the method comprising:
   sampling the composite video signal at a first clock rate, producing digital samples therefrom;
   separating the digital samples into chrominance and luminance components;
   writing the digital chrominance components representing one line into a first memory means at the first clock rate;
   writing the digital luminance components representing one line into a second memory means at the first clock rate;
   alternately reading the chrominance and luminance components from the first and second memory means, respectively, at a second clock rate after a predetermined delay;
   converting the chrominance and luminance components into analog components; and
   matrixing the analog components to produce signals representative of color signals for display on a wide-screen display.

31. A method of converting a composite line-and-field scanned video signal into a signal for display on a widescreen display wherein the picture displayed has a non-widescreen aspect ratio, the steps of the method comprising:
   sampling the composite video signal at a first clock rate, producing digital samples therefrom;
   separating the digital samples into chrominance and luminance components;
   writing the digital chrominance components representing one line into a first memory means at the first clock rate;
   writing the digital luminance components representing one line into a second memory means at the first clock rate;
   alternately reading the chrominance and luminance components at a second clock rate so as to time-compress the components;
   delaying the alternative reading of the components so as to create null components;
   converting the chrominance, luminance and null components into analog components; and
   matrixing the analog chrominance and luminance components to produce signals representative of color signals for display on a widescreen display as picture elements and matrixing the null components to produce signals representative of a border for bordering the picture elements.

32. A method of transmitting and receiving first aspect ratio television signals for display at both a first aspect ratio television receiver and a second aspect ratio television receiver, wherein the transmitted signals comprise separate luminance and chrominance signal components, the method comprising the steps of:
   transmitting the television signals at a sampling frequency proportional to the ratio of the first aspect ratio to the second aspect ratio;
   receiving the luminance and chrominance signal components and writing the luminance signal components into one memory device at a first clock rate;
   writing the chrominance signal components into another memory device at a second clock rate;
   reading the luminance signal components stored in the one memory device at either a third clock rate which represents the clock rate for displaying television signals on said first aspect ratio television receiver or a fourth clock rate corresponding to the product of the third clock rate and the ratio of the second aspect ratio to the first aspect ratio;
   reading the chrominance signal components stored in the other memory device at either a fifth clock rate which represents the clock rate for displaying television signals on said first aspect ratio television receiver or a sixth clock rate corresponding to the product of the fifth clock rate and the ratio of the second aspect ratio to the first aspect ratio; and
   selectively displaying at the respective receivers the signals read from said one and said other memory devices.

33. The method of claim 32 wherein said first clock rate and said second clock rate equal the transmitted sampling frequency.

34. An apparatus for receiving a widescreen television signal containing luminance and chrominance components occurring at a first frequency and outputting the luminance and chrominance components at a second and a third frequency, respectively, said apparatus comprising:
   a first storage device for storing a line of the luminance components at the first frequency;
   a second storage device for storing a line of luminance components at the first frequency;
   first input switch means for receiving the luminance components and directing the luminance components for storage to said first and second storage devices;
   a third storage device for storing a line of the chrominance components at the first frequency;
   a fourth storage device for storing a line of the chrominance components at the first frequency;
   second input switch means for receiving the chrominance components and alternately directing the chrominance components for storage to said third and fourth storage devices;
   first output switch means for alternately retrieving and outputting the luminance components at the second frequency from said first and second storage devices; and
   second output switch means for alternately retrieving and outputting the chrominance components at the third frequency from said third and fourth storage devices.

35. The apparatus of claim 34 further comprising:

control means for controlling said first input switch means and said first output switch means so that received luminance components are directed to one of said first and second storage devices while luminance components are retrieved from the other one of said first and second storage devices.

36. The apparatus of claim 34 further comprising:
control means for controlling said second input switch means and said second output switch means so that received chrominance components are directed to one of said third and fourth storage devices while chrominance components are retrieved from the other one of said third and fourth storage devices.

37. The apparatus of claim 34 wherein the second frequency is twice the third frequency.

38. The apparatus of claim 34 wherein the first frequency is twice the second frequency.

39. The apparatus of claim 34 wherein the first frequency is three times the third frequency.

40. An apparatus for converting a non-widescreen composite color television signal into a signal for display on a widescreen display, said apparatus comprising:
A/D converting means for sampling the non-widescreen signal at a first frequency and producing digital samples therefrom;
filter means for separating the digital video samples into chrominance and luminance component samples;
storage means for storing the chrominance and luminance component samples at the first frequency;
selective readout means for selectively reading out a block of chrominance and luminance component samples from said storage means at a second frequency higher than the first frequency;
delay means for delaying the output of the block of component samples from said storage means for a predetermined time;
D/A converting means for receiving the chrominance and luminance component samples from said storage means and producing analog signals therefrom; and
matrix means for converting the analog luminance and chrominance signals to a form appropriate for display on the widescreen display.

41. An apparatus for displaying a transmitted television signal having a first aspect ratio at both a television receiver having a first aspect ratio and a television receiver having a second aspect ratio, wherein the transmitted signal comprises luminance signal components, said apparatus comprising:
writing means for writing the luminance signal components into a first memory device at a first clock rate;
reading means for reading the luminance signal components at either a second clock rate which represents the clock rate for displaying the television signals on the television receiver having the second aspect ratio or a third clock rate corresponding to the product of the second clock rate and the ratio of the first aspect ratio to the second aspect ratio; and,
display means for selectively displaying at the respective receivers the signal components read from the first memory device.

42. An apparatus for transmitting a widescreen television signal so as to display a portion of the widescreen television signal without geometric distortion on a non-widescreen television, said apparatus comprising:
selection means for selecting the portion of the widescreen television signal;
signal generating means for developing a selection signal representative of the selected portion; and
transmitter means for transmitting the entire widescreen television signal together with the selection signal.

* * * * *